US012643769B2

(12) United States Patent
Hubbard

(10) Patent No.: US 12,643,769 B2
(45) Date of Patent: Jun. 2, 2026

(54) ELECTROMECHANICAL SAFETY ACTUATION OF ELEVATOR GOVERNORS

(71) Applicant: Otis Elevator Company, Farmington, CT (US)

(72) Inventor: James L. Hubbard, Kensington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/922,706

(22) Filed: Oct. 22, 2024

(65) Prior Publication Data

US 2026/0109574 A1    Apr. 23, 2026

(51) Int. Cl.
*B66B 5/06* (2006.01)
*B66B 5/22* (2006.01)

(52) U.S. Cl.
CPC . *B66B 5/22* (2013.01); *B66B 5/06* (2013.01)

(58) Field of Classification Search
CPC .............. B66B 5/22; B66B 5/06; B66B 5/044
See application file for complete search history.

(56) References Cited

U.S. PATENT DOCUMENTS 4,662,481 A * 5/1987 Morris .................... B66B 5/044 187/373
5,217,091 A * 6/1993 Shiina ..................... B66B 5/044 187/351
5,377,786 A * 1/1995 Nakagawa .............. B66B 5/044 187/373
6,345,696 B1 * 2/2002 Yumura .................. B66B 5/044 187/373
8,342,294 B2 * 1/2013 Madoz Michaus ..... B66B 5/044 187/373
9,975,733 B2 * 5/2018 Cunningham ............ B66B 5/18
10,654,685 B2 * 5/2020 Fauconnet ............ B66B 5/0087

(Continued)

FOREIGN PATENT DOCUMENTS

EP 3147246 A1 3/2017
EP 3360834 A1 8/2018
WO WO-9823526 A1 * 6/1998 ............. F16H 55/36

OTHER PUBLICATIONS

European Search Report for application EP 25209498.2, Issued Mar. 2, 2026 8 pages.

*Primary Examiner* — Michael A Riegelman
(74) *Attorney, Agent, or Firm* — CANTOR COLBURN LLP

(57) ABSTRACT

Elevator system governors include a traction pulley having an engagement surface and a cable wound about the traction pulley that is configured to travel along the cable. An electromechanical locking mechanism is configured to selectively engage with the traction pulley to cause operation of a safety brake of an elevator system. The locking mechanism includes a hub assembly having inner and outer engagement hubs. The inner hub has an actuator connector connectable to a safety linkage and the outer hub has an engagement surface for selectively engaging with the engagement surface of the traction pulley. An actuator is configured to selectively apply force to the outer engagement hub into engagement such that the engagement surface of the outer engagement hub and the engagement surface of the traction pulley are engaged, and to cause rotation of the inner engagement hub.

20 Claims, 10 Drawing Sheets

(56) References Cited

U.S. PATENT DOCUMENTS

| | | | | |
|---|---|---|---|---|
| 10,654,686 | B2 * | 5/2020 | Hu | B66B 5/04 |
| 11,104,545 | B2 * | 8/2021 | Chao | B66B 5/06 |
| 12,054,359 | B1 * | 8/2024 | Hubbard | B66B 1/3492 |
| 2004/0262109 | A1 * | 12/2004 | Timtner | B66B 5/044 188/377 |
| 2007/0102256 | A1 * | 5/2007 | Bacon | F16D 27/115 192/84.91 |
| 2010/0059319 | A1 * | 3/2010 | Aguado | B66B 5/044 74/25 |
| 2013/0001020 | A1 * | 1/2013 | Kigawa | B66B 5/00 187/254 |
| 2013/0098711 | A1 * | 4/2013 | Aguado | B66B 5/22 187/373 |
| 2017/0225923 | A1 * | 8/2017 | Fauconnet | B66B 5/044 |
| 2018/0244495 | A1 * | 8/2018 | Swaybill | B66B 1/3492 |
| 2020/0180908 | A1 * | 6/2020 | Chao | B66B 5/18 |

* cited by examiner

ELECTROMECHANICAL SAFETY ACTUATION OF ELEVATOR GOVERNORS

BACKGROUND

The present disclosure relates to elevator systems and, in particular, to an elevator system and more particularly to electromechanical safety actuation of elevator governors.

In an elevator system, in particular, an elevator shaft is built into a building and an elevator car travels up and down along the elevator shaft to arrive at landing doors of different floors of the building. The movement of the elevator is driven by a machine that is controlled by a controller according to instructions received from users of the elevator system. During operational conditions, passengers will typically arrive at an elevator landing in a building, press a call button and wait for the elevator to arrive. Once the elevator arrives and its doors open, the passenger will enter the elevator and select a destination floor. The doors close and the elevator travels upwardly or downwardly to the selected floor whereupon the passenger disembarks.

SUMMARY

According to some embodiments, elevator system governors are provided. The elevator system governors include a traction pulley having an engagement surface, a cable wound about the traction pulley, wherein the traction pulley is configured to travel along the cable, and an electromechanical locking mechanism configured to selectively engage with the traction pulley to cause operation of a safety brake of an elevator system. The electromechanical locking mechanism includes a hub assembly having an inner engagement hub and an outer engagement hub, the inner engagement hub comprises an actuator connector configured to connect to a safety linkage, the outer engagement hub comprises an engagement surface configured to selectively engage with the engagement surface of the traction pulley, and an actuator is configured to selectively apply force to the outer engagement hub to transition the outer engagement hub from a disengaged position to an engaged position wherein the engagement surface of the outer engagement hub and the engagement surface of the traction pulley are engaged, and to cause rotation of the inner engagement hub.

In addition to one or more of the features described above, or as an alternative, further embodiments of the elevator system governors may include at least one hub fastener arranged to connect the outer engagement hub to the inner engagement hub, wherein at least one hub fastener is threadedly connected to the inner engagement hub and retains the outer engagement hub to the inner engagement hub.

In addition to one or more of the features described above, or as an alternative, further embodiments of the elevator system governors may include that the engagement surface of the outer engagement hub and the engagement surface of the traction pulley are configured as complimentary sets of teeth or complimentary friction surfaces.

In addition to one or more of the features described above, or as an alternative, further embodiments of the elevator system governors may include at least one biasing element arranged between the inner engagement hub and the outer engagement hub, the at least one biasing element configured to bias the outer engagement hub toward the disengaged position.

In addition to one or more of the features described above, or as an alternative, further embodiments of the elevator system governors may include that the actuator is configured to apply a force to overcome a biasing force of the at least one biasing element to urge the outer engagement hub into the engaged position.

In addition to one or more of the features described above, or as an alternative, further embodiments of the elevator system governors may include an idler pulley, wherein the cable is wound about the idler pulley.

In addition to one or more of the features described above, or as an alternative, further embodiments of the elevator system governors may include an encoder operably coupled to the idler pulley and a controller configured to receive a signal from the encoder, the controller configured to cause actuation of the actuator in response to detection of an overspeed event determined from the signal from the encoder.

In addition to one or more of the features described above, or as an alternative, further embodiments of the elevator system governors may include an actuator bracket, wherein the actuator is mounted on the actuator bracket and positioned in an axial position relative to an axis through the hub assembly.

In addition to one or more of the features described above, or as an alternative, further embodiments of the elevator system governors may include that the actuator is arranged offset from an axis through the hub assembly, the elevator system governor further comprising a pivot arm operably connecting the actuator to the outer engagement hub.

In addition to one or more of the features described above, or as an alternative, further embodiments of the elevator system governors may include that the outer engagement hub comprises a connector opening, wherein the actuator connector of the inner engagement hub extends through the connector opening of the outer engagement hub.

According to some embodiments, elevator systems are provided. The elevator systems include an elevator car configured to travel within an elevator shaft, the elevator car configured with a safety brake, a counterweight operably connected to the elevator car and configured to travel within the elevator shaft, the counterweight configured with a safety brake, and an elevator system governor operably connected to one of the elevator car and the counterweight and connecting said elevator car or counterweight to a respective safety brake. The elevator system governor includes a traction pulley having an engagement surface, a cable extending along the elevator shaft and wound about the traction pulley, wherein the traction pulley is configured to travel along the cable, and an electromechanical locking mechanism configured to selectively engage with the traction pulley to cause operation of the respective safety brake. The electromechanical locking mechanism includes a hub assembly having an inner engagement hub and an outer engagement hub, the inner engagement hub comprises an actuator connector configured to connect to a safety linkage that connects to the respective safety brake, the outer engagement hub comprises an engagement surface configured to selectively engage with the engagement surface of the traction pulley, and an actuator is configured to selectively apply force to the outer engagement hub to transition the outer engagement hub from a disengaged position to an engaged position wherein the engagement surface of the outer engagement hub and the engagement surface of the traction pulley are engaged, and to cause rotation of the inner engagement hub to actuate the respective safety brake.

In addition to one or more of the features described above, or as an alternative, further embodiments of the elevator systems may include that the elevator system governor is a first elevator system governor operably connected between the elevator car and the safety brake thereof. The elevator system further includes a second elevator system governor operably connected between the counterweight and the safety brake thereof.

In addition to one or more of the features described above, or as an alternative, further embodiments of the elevator systems may include at least one hub fastener arranged to connect the outer engagement hub to the inner engagement hub, wherein at least one hub fastener is threadedly connected to the inner engagement hub and retains the outer engagement hub to the inner engagement hub.

In addition to one or more of the features described above, or as an alternative, further embodiments of the elevator systems may include that the engagement surface of the outer engagement hub and the engagement surface of the traction pulley are configured as complimentary sets of teeth or complimentary friction surfaces.

In addition to one or more of the features described above, or as an alternative, further embodiments of the elevator systems may include at least one biasing element arranged between the inner engagement hub and the outer engagement hub, the at least one biasing element configured to bias the outer engagement hub toward the disengaged position.

In addition to one or more of the features described above, or as an alternative, further embodiments of the elevator systems may include that the actuator is configured to apply a force to overcome a biasing force of the at least one biasing element to urge the outer engagement hub into the engaged position.

In addition to one or more of the features described above, or as an alternative, further embodiments of the elevator systems may include an idler pulley, wherein the cable is wound about the idler pulley.

In addition to one or more of the features described above, or as an alternative, further embodiments of the elevator systems may include an encoder operably coupled to the idler pulley and a controller configured to receive a signal from the encoder, the controller configured to cause actuation of the actuator in response to detection of an overspeed event determined from the signal from the encoder.

In addition to one or more of the features described above, or as an alternative, further embodiments of the elevator systems may include an actuator bracket, wherein the actuator is mounted on the actuator bracket and positioned in an axial position relative to an axis through the hub assembly.

In addition to one or more of the features described above, or as an alternative, further embodiments of the elevator systems may include that the actuator is arranged offset from an axis through the hub assembly, the elevator system governor further comprising a pivot arm operably connecting the actuator to the outer engagement hub.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
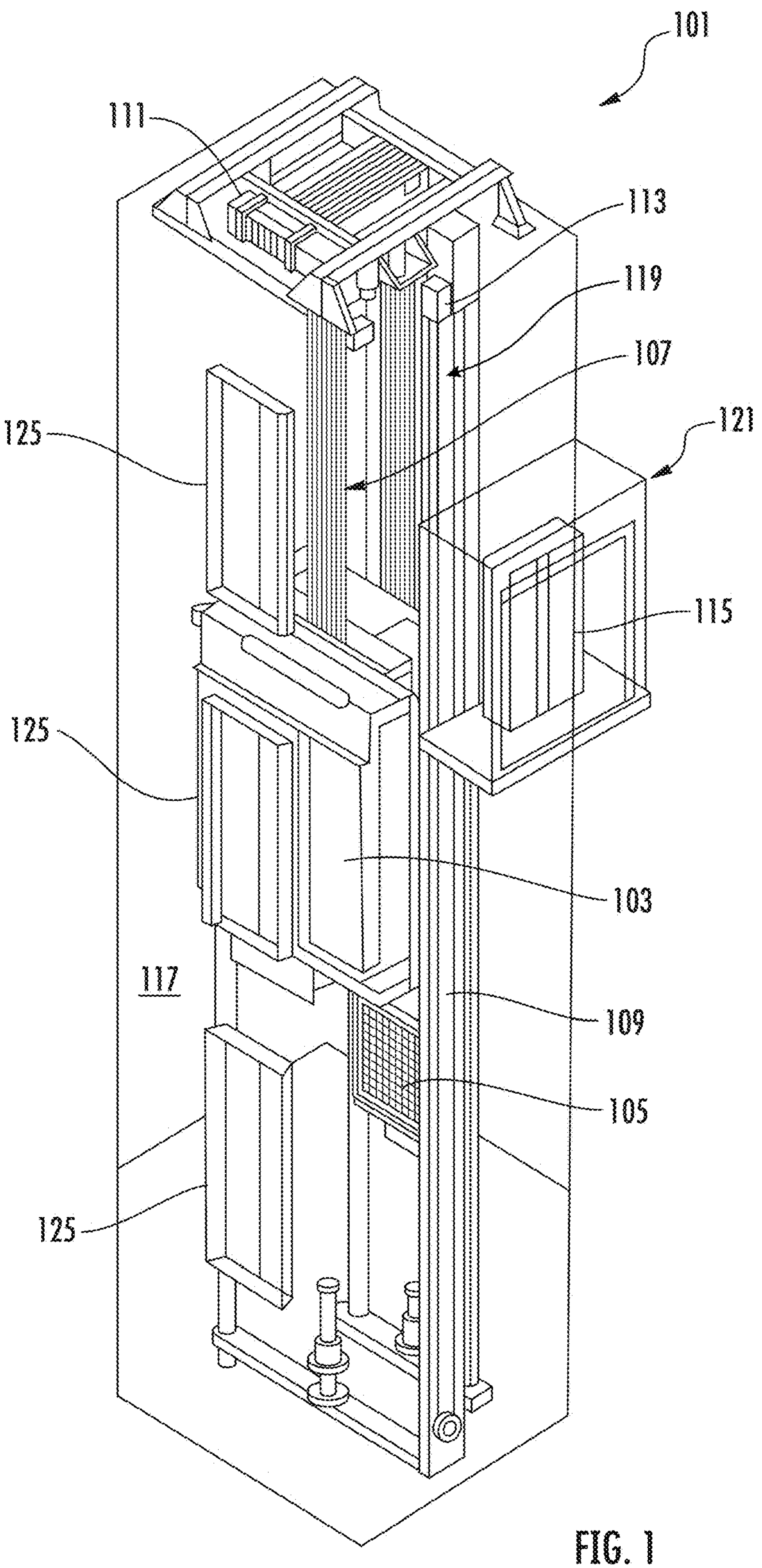
FIG. 1 is a perspective view of an elevator system in accordance with embodiments.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which, in this illustrative embodiment, is part of an overhead structure of the elevator system 101, although other arrangements are possible without departing from the scope of the present disclosure. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown in the illustrative arrangement, in a controller room 121 of the elevator shaft 117 and is configured to control the operation of the elevator system 101, and particularly the elevator car 103. In other embodiments the controller 115 can be located in other locations, including, but not limited to, fixed to a landing or landing door or located in a cabinet at a landing. The elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes.

Figure 2:
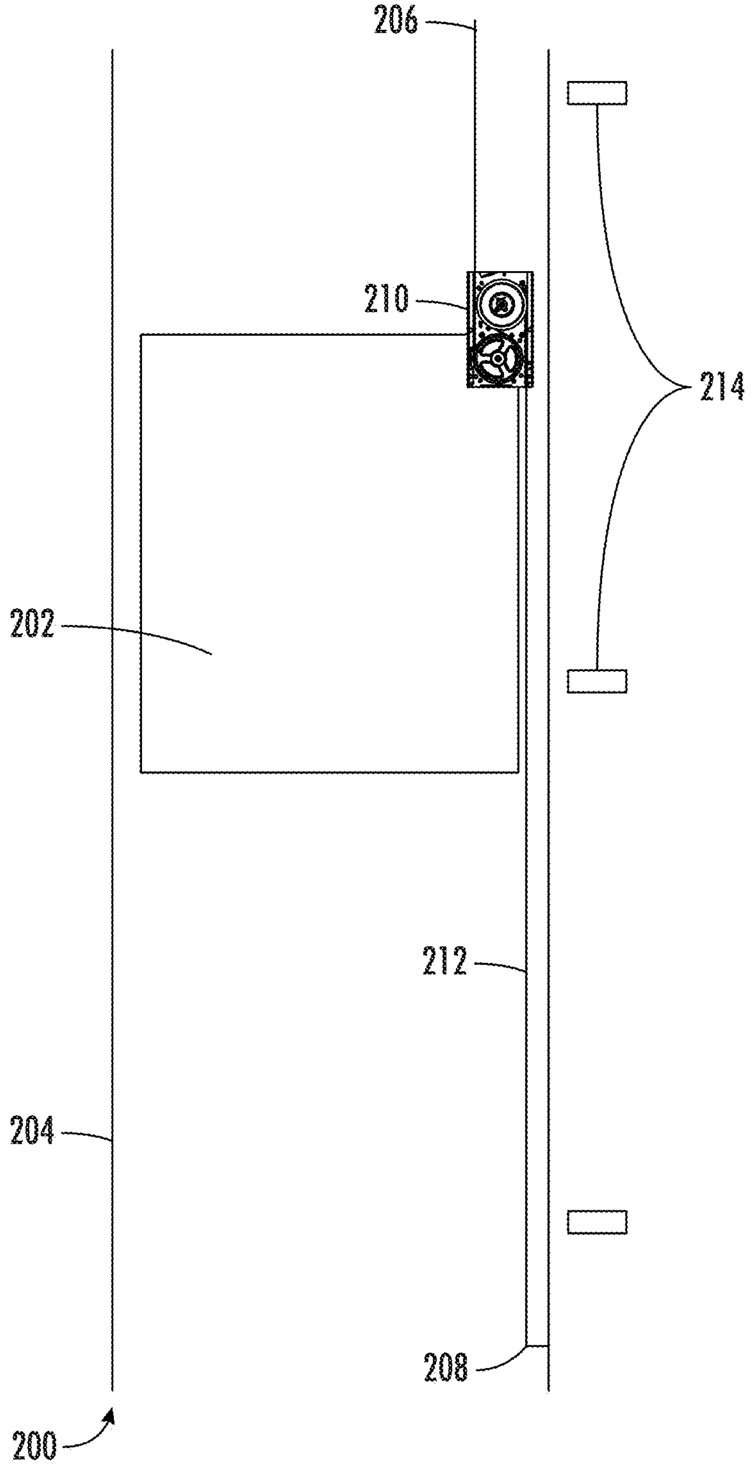
FIG. 2 is a schematic diagram illustrating an elevator system in accordance with embodiments.

With reference to FIG. 2, an elevator system 200 that may incorporate embodiments of the present disclosure is shown. The elevator system 200 includes an elevator car 202 that is configured to travel in a hoistway or elevator shaft 204. The elevator system 200 includes a rope anchor 206, a rope tensioning mass 208, a car mounted governor (CMG) 210, and a cable 212. The CMG 210 is affixable to the elevator car 202 and includes various components, including but not limited to a traction pulley, an idler pulley, and at least one encoder. The at least one encoder can be mountable on at least one of the traction pulley and the idler pulley and can be configured to generate a signal reflective of rotation of the respective pulley. The cable 212 is extendible from the rope anchor 206, around the pulleys of the CMG 210, and to the rope tensioning mass 208. As the elevator car 202 travels along the hoistway 204, the pulleys of the CMG 210 will rotate and the cable 212 will be fed through the rotating pulleys (i.e., the cable 212 does not travel, but rather the pulleys rotate along the cable 212 as the elevator car 202 travels along the hoistway 204).

As shown in FIG. 2, the elevator system 200 may include one or more sensors 214 and/or magnetic strips. The sensors 214 can be positioned in or along the hoistway 204 and may be provided and configured for position detection of the elevator car 202 in the hoistway 204, as will be appreciated by those of skill in the art. The position detection can be used, for example, for calibration of the elevator system 200 and/or monitoring movement, speed, acceleration, and position of the elevator car 202 within the hoistway 204. The combination of the encoder on the CMG 210 and the sensors 214 may provide redundancy for position, movement, speed, and acceleration monitoring of the elevator car 202 within the hoistway 204.

Figure 3:
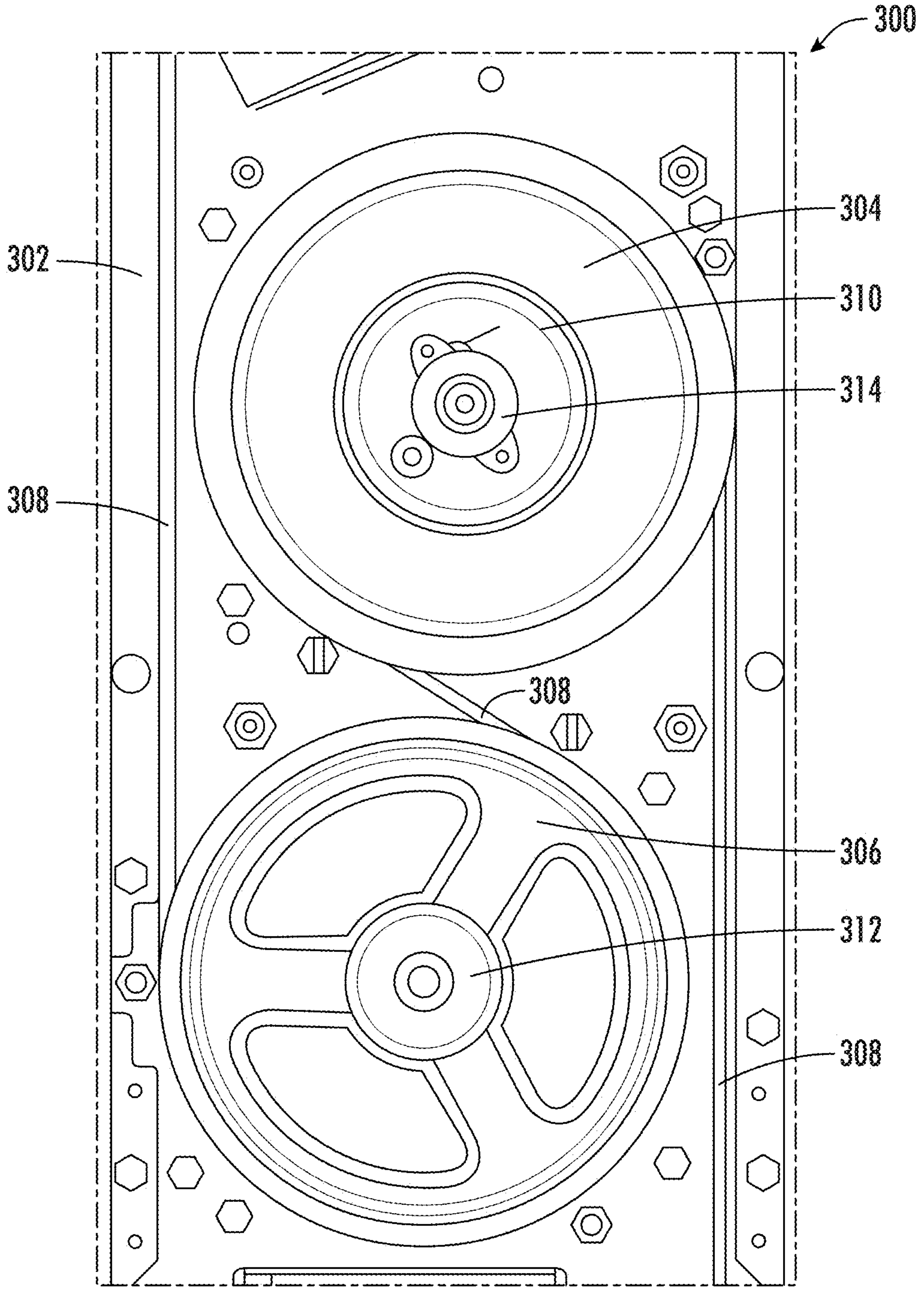
FIG. 3 is a schematic diagram of an elevator system governor that may incorporate embodiments of the present disclosure.

With reference to FIG. 3, a schematic illustration of a car mounted governor (CMG) 300 that may incorporate embodiments of the present disclosure is shown. The CMG 300 is configured to affix or otherwise be mounted or attached to an elevator car. The CMG 300 includes a body 302, a traction pulley 304, and an idler pulley 306. A cable 308 is configured to extend between a rope anchor and a rope tensioning mass (e.g., see FIG. 2). The cable 308 is configured to be wound about the traction pulley 304 and the idler pulley 306, and the pulleys 304, 306 are configured to rotate and spin as an associated elevator car travels along the cable 308. The rotation of the pulleys 304, 306 may be monitored by one or more respective encoders 310, 312. By monitoring the signals of the encoder(s) 310, 312 a computer or the like may be configured to monitor a position, speed, acceleration, or the like of an elevator car to which the CMG 300 is mounted. The CMG 300 may also include a locking mechanism 314. The locking mechanism 314 can be mountable to one of the pulleys 304, 306 or can be generally disposed anywhere within the CMG 300. The locking mechanism 314 may be configured for safety actuation with remote tripping and can include a switch for periodic actuation checks, as will be appreciated by those of skill in the art.

In conventional CMGs, spinning weights are used to detect and trigger an overspeed switch and actuate safeties on the elevator car (and/or counterweight). The mechanical weight of this type of CMG mechanism is complex and requires precise factory calibration. Furthermore, the spinning weights can cause false trips based on sudden accelerations of the elevator car due to inertia overshoot.

The encoders on the CMG, such as shown in FIG. 3 and in accordance with embodiments of the present disclosure, may be provided for speed and position feedback related to movement of an associated elevator car. The encoder configuration can provide precise car speed information. The speed, as obtained from the encoder(s), can be used to signal relays to trigger an overspeed condition and drop machine brakes to stop an elevator car and/or may be used to trigger an electro-mechanical mechanism to actuate the safeties of the traveling component (e.g., elevator car or counterweight). Embodiments of the present disclosure are directed to an electro-mechanical actuation mechanism with a clutch or similar component. The electro-mechanical actuation mechanism consists of a traction sheave (or pulley) with an engagement surface that is configured to selectively interact with an engagement hub having a complementary engagement surface. The engagement surfaces, as shown and described herein, may be toothed configurations. However, it will be appreciated that other configurations of engagement surfaces may be employed without departing from the scope of the present disclosure. For example, and without limitation, the illustrated toothed configurations may be replaced with gear-like teeth (e.g., no sharp or pointed end). In still other embodiments, the two engagement surfaces may be provided with friction coating, friction material, friction surface treatment, or friction features that allow for a fixed engagement thereof by means of frictional forces. In some such embodiments, such as with a friction engagement surface, a force applied by the actuator may be required to be greater than a force application of a toothed configuration to ensure complete engagement and transfer of rotational force to cause actuation of the safety brakes.

Engagement between the two sets of engagement surfaces (sheave/pulley and engagement hub) causes the two components to engage together, which can cause actuation of the safeties to thereby stop travel of a traveling component (e.g., elevator car or counterweight). An actuator and an optional actuation feedback switch may be provided for controlling and/or monitoring operation of the electro-mechanical actuation mechanism. For example, in accordance with an example operation in accordance with the present disclosure, when a signal to actuate the safeties is generated by an overspeed condition, the actuator may be energized to urge the engagement hub toward the traction sheave. The engagement surfaces of the engagement hub and traction sheave will engage and cause a selective and temporary connection between the engagement hub and the traction sheave. As the traction sheave rotates, such as due to traveling along a cable, the now engaged engagement hub will also rotate. The rotation of the engagement hub will cause actuation of a safety actuation lever to thereby set/activate the safeties (brakes) of the elevator car or counterweight.

Figure 4B:
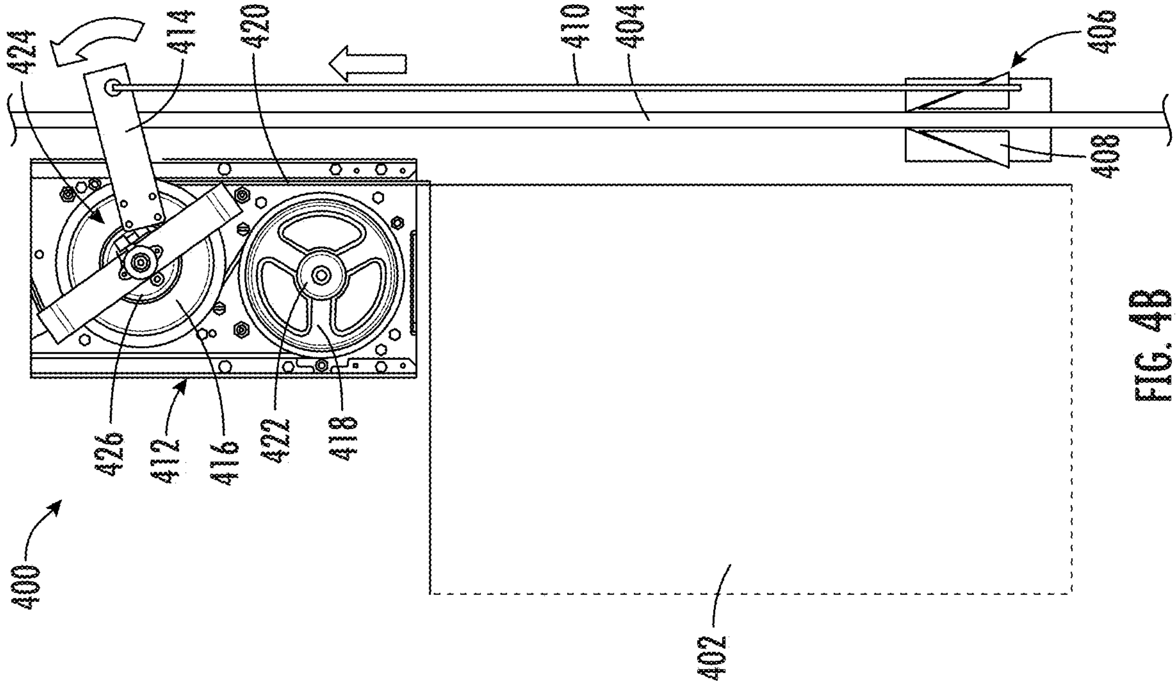
FIG. 4B is a schematic illustration of the elevator system of FIG. 4A during an emergency braking operation.
Figure 4A:
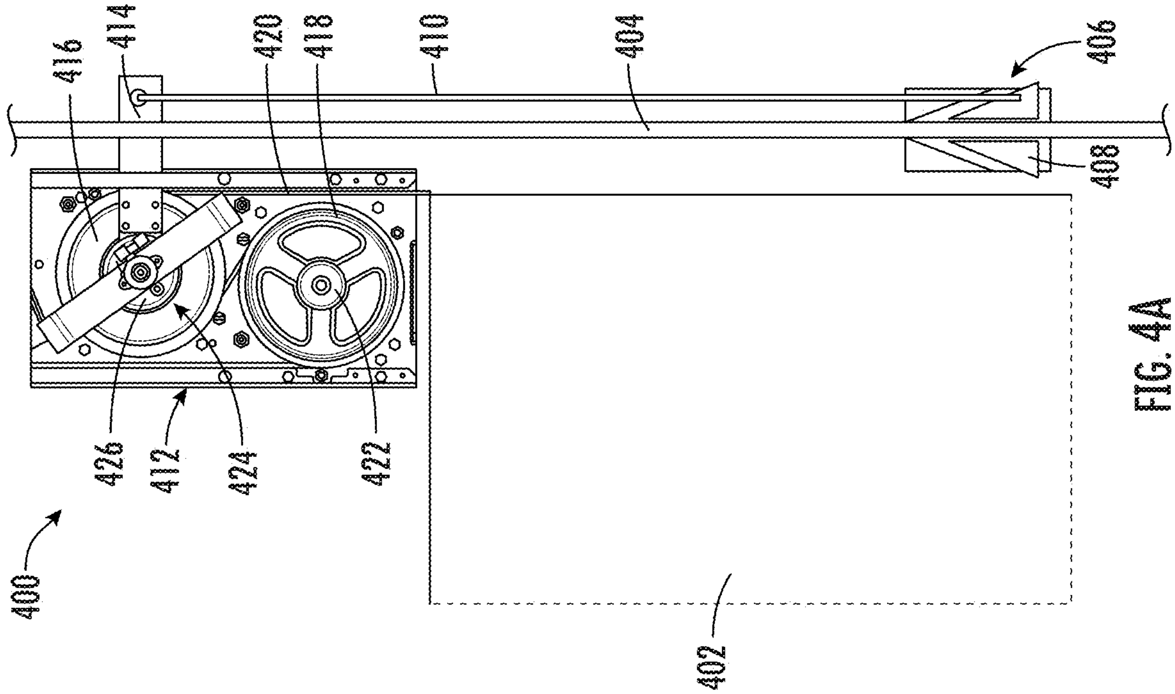
FIG. 4A is a schematic illustration of an elevator system in accordance with an embodiment of the present disclosure.

Referring now to FIGS. 4A-4B, schematic illustrations of an elevator system 400 in accordance with an embodiment of the present disclosure are shown. FIG. 4A illustrates the elevator system 400 in a normal operating state and FIG. 4B illustrates the elevator system 400 in an emergency stopped state. The elevator system 400 includes an elevator car 402 that is configured to travel along a hoistway or elevator shaft. The elevator car 402 is configured to travel along one or more guide rails 404. The elevator car 402 is equipped with one or more safety brakes 406 that are configured to selectively engage with the guide rail 404 to stop motion of the elevator car 402. The safety brakes 406 may include a wedge configuration with wedges 408, as will be appreciated by those of skill in the art. The wedges 408 of the safety brakes 406 may be pulled into engagement with the guide rails 404 by operation of a safety linkage 410.

The safety linkage 410 is operably connected to a car mounted governor (CMG) 412 by an actuation connector 414. The CMG 412 includes a traction pulley (or sheave) 416, an idler pulley (or sheave) 418, with a cable 420 wound about the pulleys 416, 418 and fixedly attached to the top and bottom of an elevator shaft, as will be appreciated by those of skill in the art. The idler pulley 418 may be provided with an encoder 422 that is arranged and configured to monitor the speed of rotation of the idler pulley 418 and thereby determine a rate of travel of the elevator car 402. The encoder 422 may be operably connected to or otherwise in communication with an electromechanical locking mechanism 424 that is associated with the traction pulley 416. Upon actuation of the electromechanical locking mechanism 424, a hub assembly 426 of the electromechanical locking mechanism 424 may engage with the traction pulley 416. The hub assembly 426 is configured to apply an actuation force to the actuation connector 414. For example, as shown in FIG. 4B, the actuation connector 414 may be rotated in a counterclockwise direction (in this illustrative arrangement) to apply an upward force on the safety linkage 410. The actuation connector 414 may be a lever arm or the like that is connected at one end thereof to the safety linkage 410 and an opposite end is connected or otherwise arranged to interact with the hub assembly 426 of the electromechanical locking mechanism 424.

Figure 5:
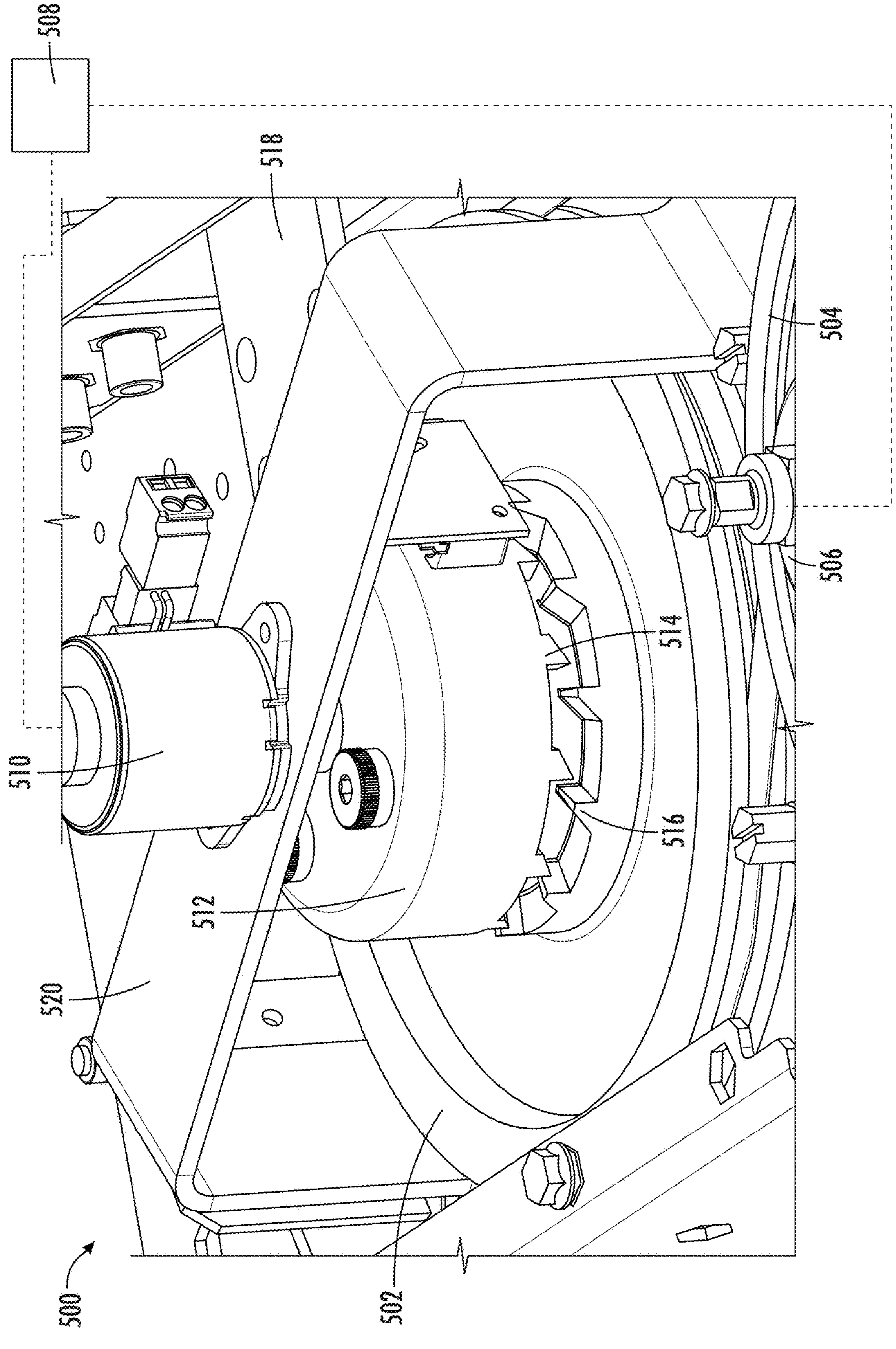
FIG. 5 is a schematic illustration of an elevator system governor in accordance with an embodiment of the present disclosure.

Referring now to FIG. 5, a schematic illustration of a portion of an elevator system governor 500 in accordance with an embodiment of the present disclosure is shown. The elevator system governor 500 may be mounted to an elevator car, an elevator counterweight, or other elevator system traveling component. The elevator system governor 500 is configured to provide operable communication from an elevator traveling component to an emergency safety brake, such as shown and described above. The elevator system governor 500 includes a traction pulley 502 and an idler pulley 504. The idler pulley 504 may be configured with an encoder 506 that is arranged to monitor a speed of rotation of the idler pulley 504 and thus monitor a speed of travel of an associated elevator car. In the event of an overspeed event in which emergency safety brakes should be applied, a signal from the encoder 506 may be received at a controller 508 of the elevator system governor 500 (or associated with the elevator system more generally). For example, in normal operation, during a braking or overspeed event, elevator machine brakes may be applied. If the speed of the elevator component continues to increase, the controller 508 may then trigger operation of an actuator 510 to perform an emergency stop. In such operation, the actuator 510 is configured to cause movement of a hub assembly 512 into engagement with a feature of the traction pulley 502.

As shown, the hub assembly 512 includes an engagement surface 514, in this configuration in the form of teeth. The traction pulley 502 includes a corresponding engagement surface 516, arranged as a corresponding set of teeth. In normal operation, the traction pulley 502 is free to rotate relative to the hub assembly 512 without the engagement surface 516 contacting or interacting with the engagement 514 of the hub assembly 512. However, if the actuator 510 is operated, such as to cause safety brakes to engage with a guide rail, the actuator 510 will cause the hub assembly 512 to move closer to the traction pulley 502. As the hub assembly 512 moves closer to the traction pulley 502, the rotating engagement surface 516 will contact the engagement surface 514 of the hub assembly 512. When the engagement surfaces 514, 516 engage with each other, the hub assembly 512 will be caused to rotate. As the hub assembly 512 rotates, the hub assembly 512 will apply a force to an actuation connector 518. The actuation connector 518 is operably connected to a safety linkage, such as shown and described with respect to FIGS. 4A-4B. Accordingly, as the hub assembly 512 is rotated into contact with the actuation connector 518, the actuator connector 518 will apply a force to the safety linkage to thereby cause safety brakes to engage and stop movement of an associated elevator car. The actuator 510 and the hub assembly 512 may be supported on a support bracket 520 that is fixedly attached to a body or part of the elevator system governor 500.

Figure 6A:
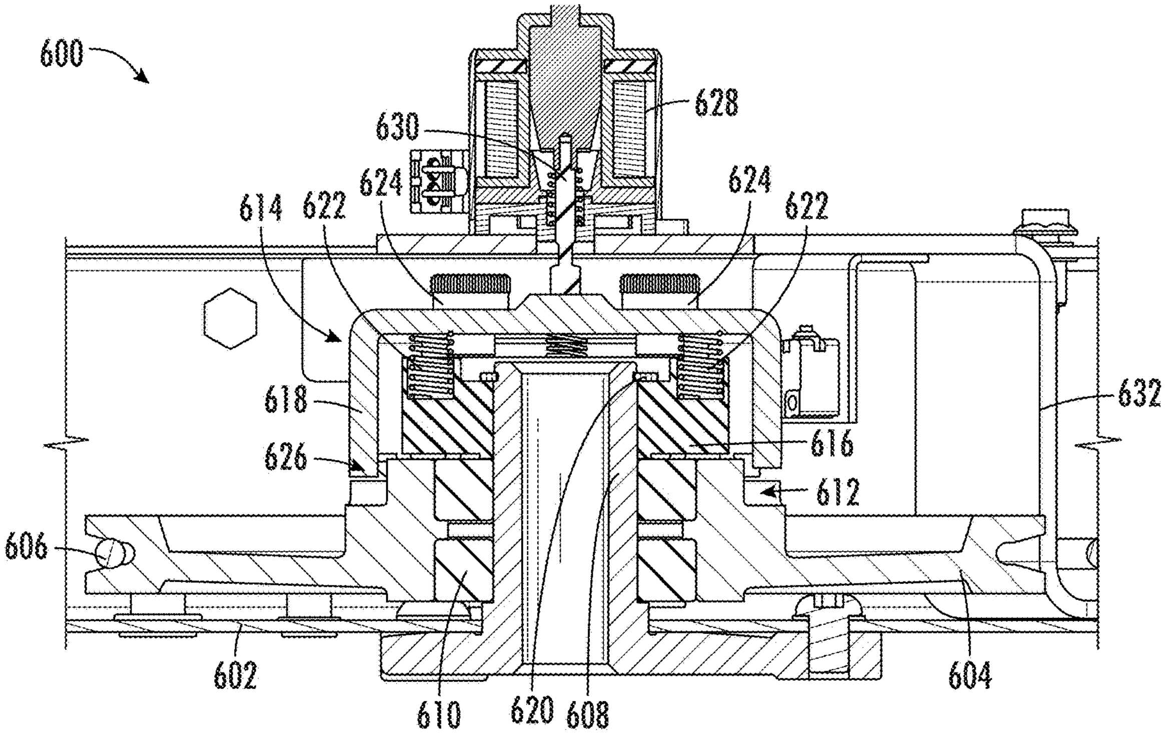
FIG. 6A is a cross-sectional view of an electromechanical locking mechanism of an elevator system governor in a normal state of operation, in accordance with an embodiment of the present disclosure.
Figure 6B:
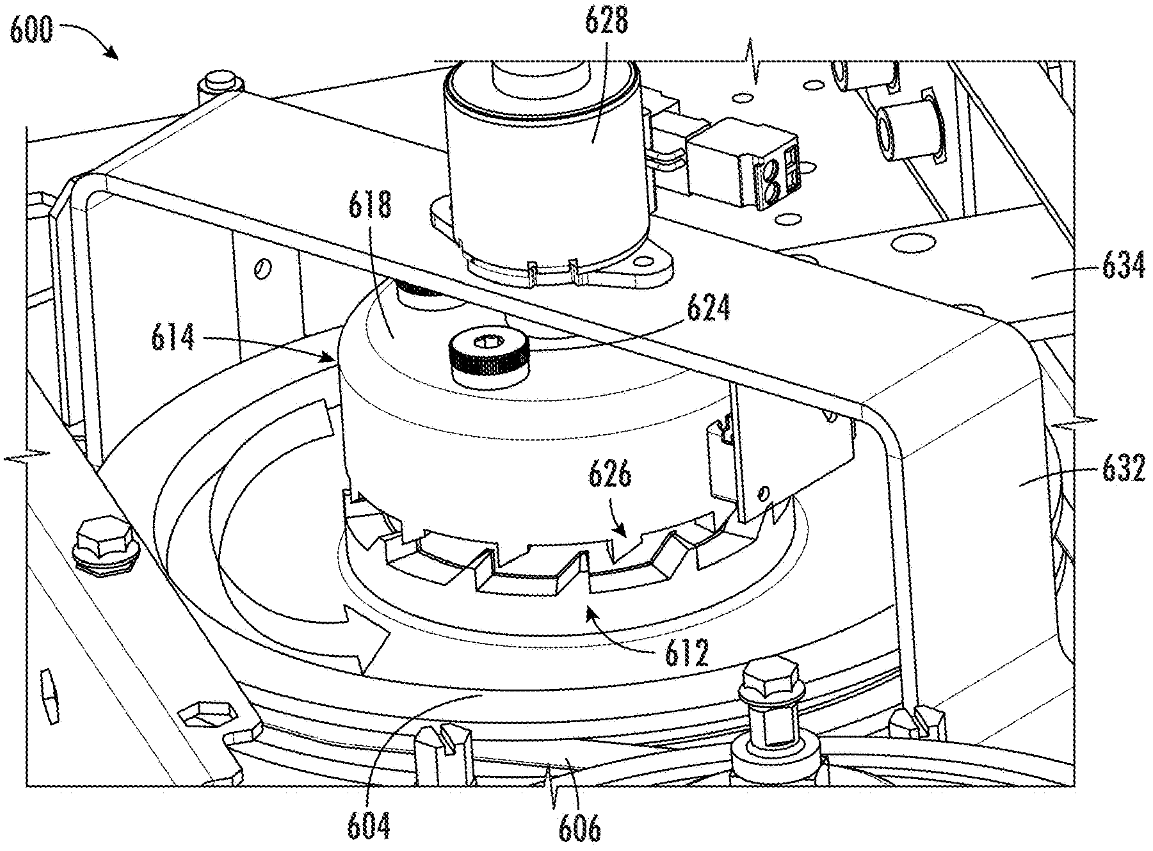
FIG. 6B is a perspective view of the electromechanical locking mechanism of FIG. 6A in the normal state of operation.
Figure 6C:
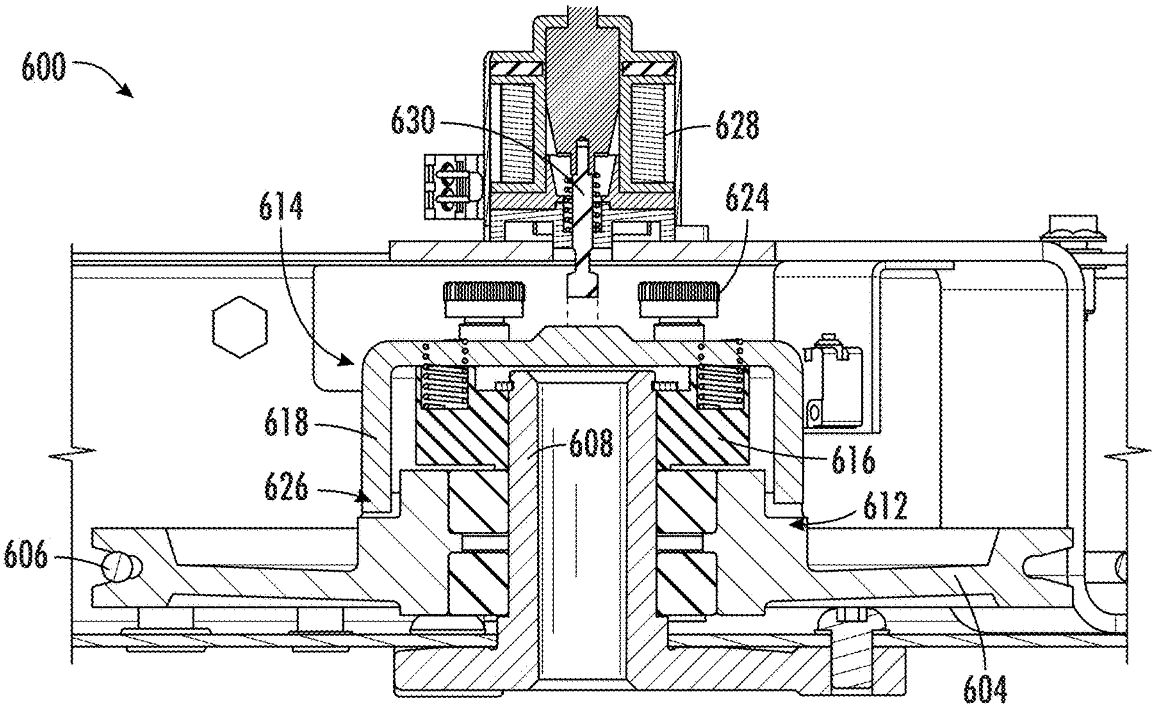
FIG. 6C is a cross-sectional view of the electromechanical locking mechanism of FIG. 6A in an actuated state.
Figure 6D:
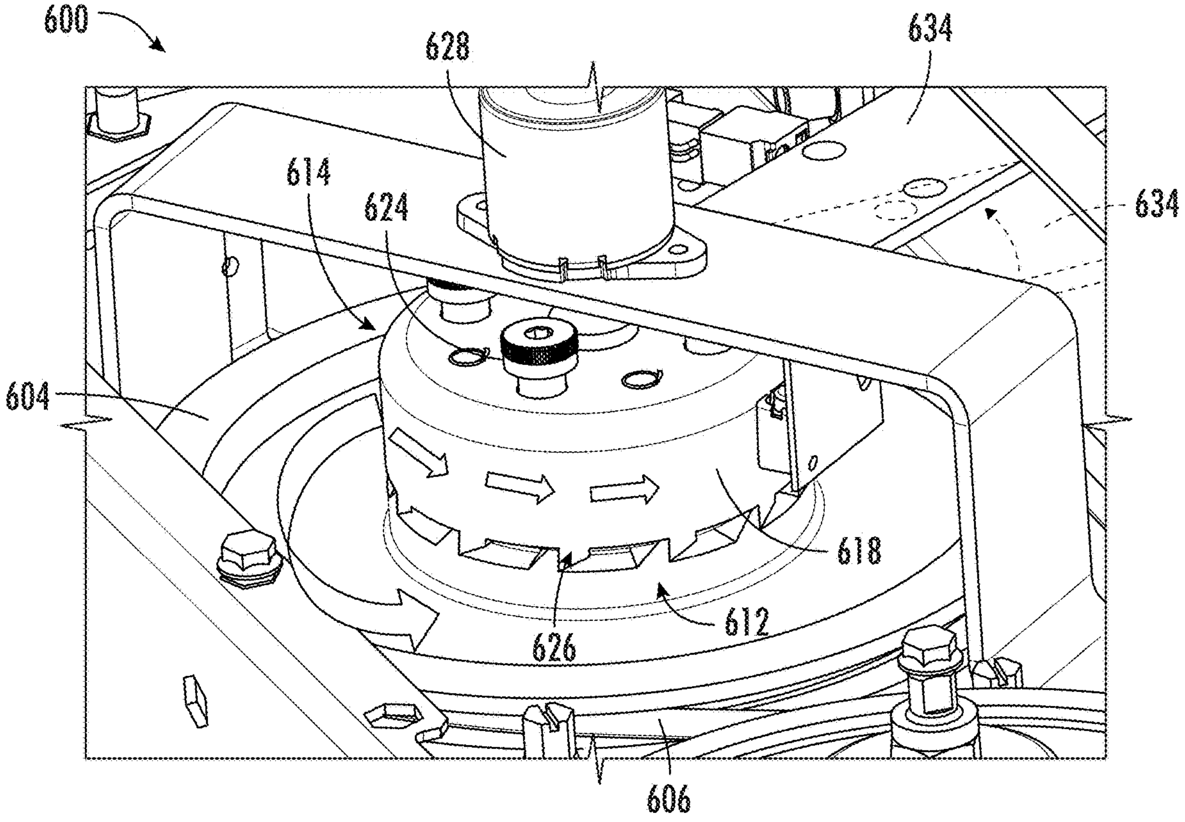
FIG. 6D is a perspective view of the actuated state of the electromechanical locking mechanism shown in FIG. 6C.
Figure 6E:
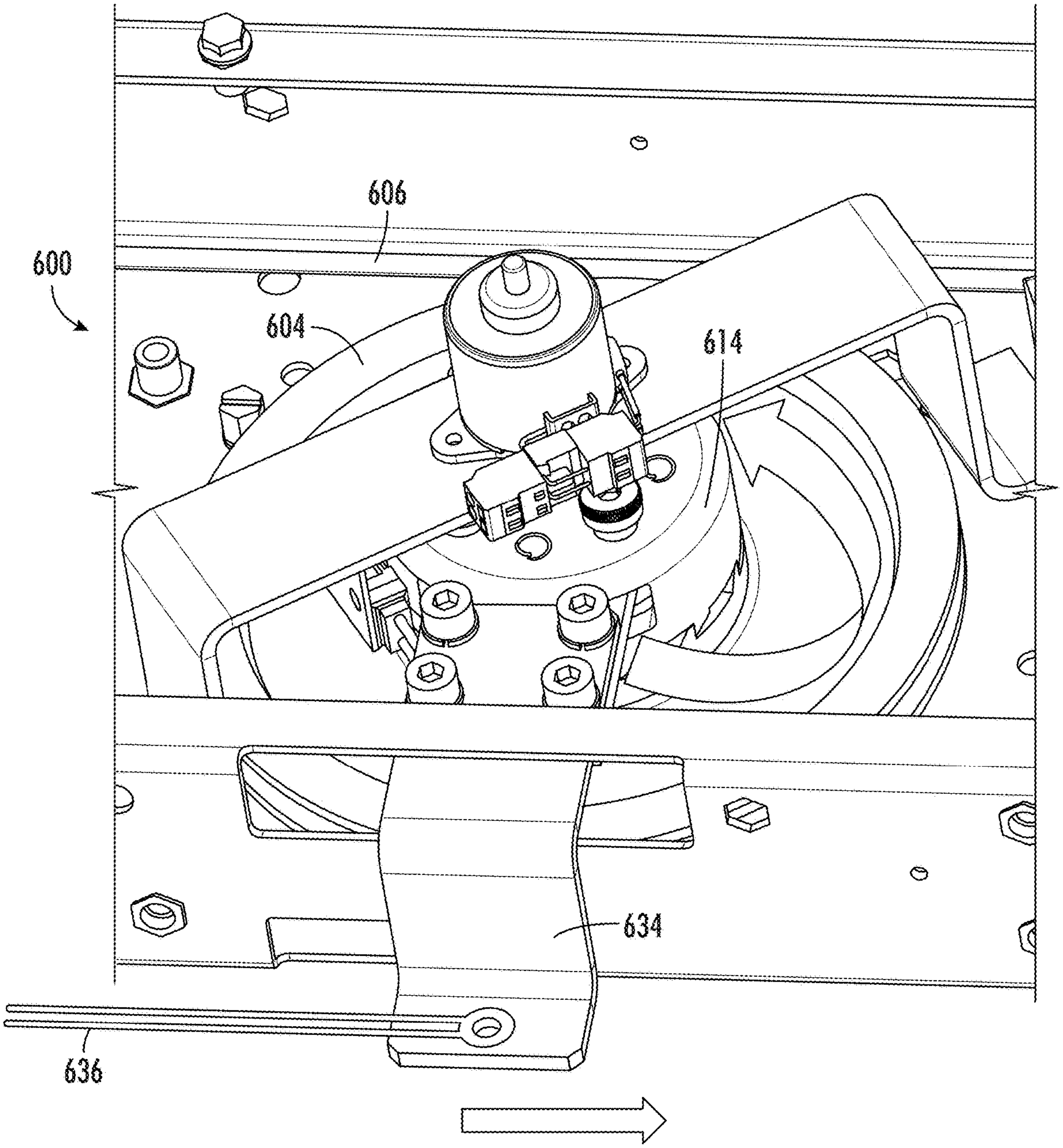
FIG. 6E is an alternative perspective view of the actuated state of the electromechanical locking mechanism shown in FIG. 6C.

Referring now to FIGS. 6A-6E, schematic illustrations of operation of an electromechanical locking mechanism 600 in accordance with an embodiment of the present disclosure are shown. FIG. 6A illustrates a side, cross-sectional illustration of the electromechanical locking mechanism 600 in a state of normal operation, FIG. 6B is a perspective view of the electromechanical locking mechanism 600 during the normal operation state, FIG. 6C is a side elevation view thereof during an actuation operation, FIG. 6D is a perspective illustration of the actuation operation, and FIG. 6E is an alternative view of the actuation operation of the electromechanical locking mechanism 600.

The electromechanical locking mechanism 600 is arranged as part of a governor 602 of an elevator system, similar to that shown and described above. The governor 602 includes a traction pulley 604 that is rotated through interaction with a cable 606, as described above. The traction pulley 604 is rotationally mounted on a governor shaft 608 via a set of bearings 610. The governor shaft 608 is integrally formed with or fixedly attached to a body or housing of the governor 602, and thus is a stationary component relative to the traction pulley 604.

The traction pulley 604 includes an engagement surface 612, illustrated as mechanical teeth, that is configured to interact with other parts of the electromechanical locking mechanism 600. In this illustrative configuration, the electromechanical locking mechanism 600 includes a hub assembly 614 having an inner engagement hub 616 and an outer engagement hub 618. The inner engagement hub 616 is free to rotate relative to the shaft 608 and is axially secured to the shaft 608 by a shaft fastener 620 (e.g., c-clip or the like). That is, the inner engagement hub 616 is fixed axially relative to the shaft 608 but is free to rotate relative thereto.

The inner engagement hub 616 supports biasing elements 622 that are arranged to bias the outer engagement hub 618 in a direction away from the traction pulley 604 (i.e., a direction along the shaft 608). The outer engagement hub 618 is movably attached to the inner engagement hub 616 by one or more hub fasteners 624. The hub fasteners 624 may be configured as threaded pins or shoulder bolts or the like. The outer engagement hub 618 includes through holes or apertures that receive a shaft of the hub fasteners 624 therethrough, with a head of the hub fasteners 624 arranged on an outer surface of the outer engagement hub 618 and a threaded end of the hub fasteners 624 is configured to threadedly engage and attach to the inner engagement hub 616. As such, the outer engagement hub 618 is retained between the inner engagement hub 616 and heads of the hub fasteners 624 which threadedly attach to the inner engagement hub 616. The outer engagement hub 618 is normally biased away from the inner engagement hub 616 during regular or normal operation by means of the biasing elements 622. The outer engagement hub 618 can move axially along and relative to the hub fasteners 624.

The outer engagement hub 618 includes an engagement surface 626 that is configured to selectively engage with the engagement surface 612 of the traction pulley 604. The outer engagement hub 618 is arranged such that the outer engagement hub 618 is movable into engagement with the traction pulley 604 such that the engagement surface 626 of the outer engagement hub 618 engages with the engagement surface 612 of the traction pulley 604. When the engagement surfaces 612, 626 engage together, rotational force from the traction pulley 604 may be applied to the outer engagement hub 618, thereby causing the outer engagement hub 618 to rotate.

The electromechanical locking mechanism 600 further includes an actuator 628, such as a solenoid. The actuator 628 includes an actuator arm 630 that is operably connected to or in contact with the outer engagement hub 618. During actuation of the actuator 628, the actuator arm 630 will urge the outer engagement hub 618 toward the traction pulley to cause engagement between the engagement surfaces 612, 626. In this illustrative embodiment, the actuator 628 is axially aligned with the shaft 608 and thus is configured to apply a force directly to the outer engagement hub 618. To accommodate such positioning, the actuator 628 is mounted on an actuator bracket 632. To cause operation of a safety brake via a safety linkage, the electromechanical locking mechanism 600 includes an actuation connector 634 that is operably connected to a safety linkage or the like, as shown and described above. The outer engagement hub 618 is configured to apply a force to the actuation connector 634, which may be fixedly attached to or integrally formed with the inner engagement hub 616, as described herein. Accordingly, when the outer engagement hub 618 is moved into engagement with the traction pulley 604, the rotation from the traction pully 604 will be transferred to the inner engagement hub 616 via the hub fasteners 624 and the outer engagement hub 618. This causes the actuation connector 634 to be moved and apply a force to a safety linkage to thereby engage safety brakes of an elevator system.

FIGS. 6A-6B illustrate the normal operating condition where the outer engagement hub 618 is disengaged from the traction pulley 604. In this position, the traction pulley 604 is free to rotate as the traction pulley 604 travels along the cable 606. The outer engagement hub 618 is biased away from the traction pulley 604 such that the engagement surface 626 of the outer engagement hub 618 does not interfere with free rotation of the engagement surface 612 of the traction pulley 604.

FIGS. 6C-6E illustrate an emergency stopping operation condition where the outer engagement hub 618 has been urged into engagement with the traction pulley 604. As shown in FIGS. 6D-6E, in this position, the rotation of the traction pulley 604 is transferred into the outer engagement hub 618 causing rotation of the hub assembly 614. As the hub assembly 614 rotates, the actuation connector 634 is rotated or pivoted and applies an operating force to a connected safety linkage 636 (shown in FIG. 6E).

Figure 7A:
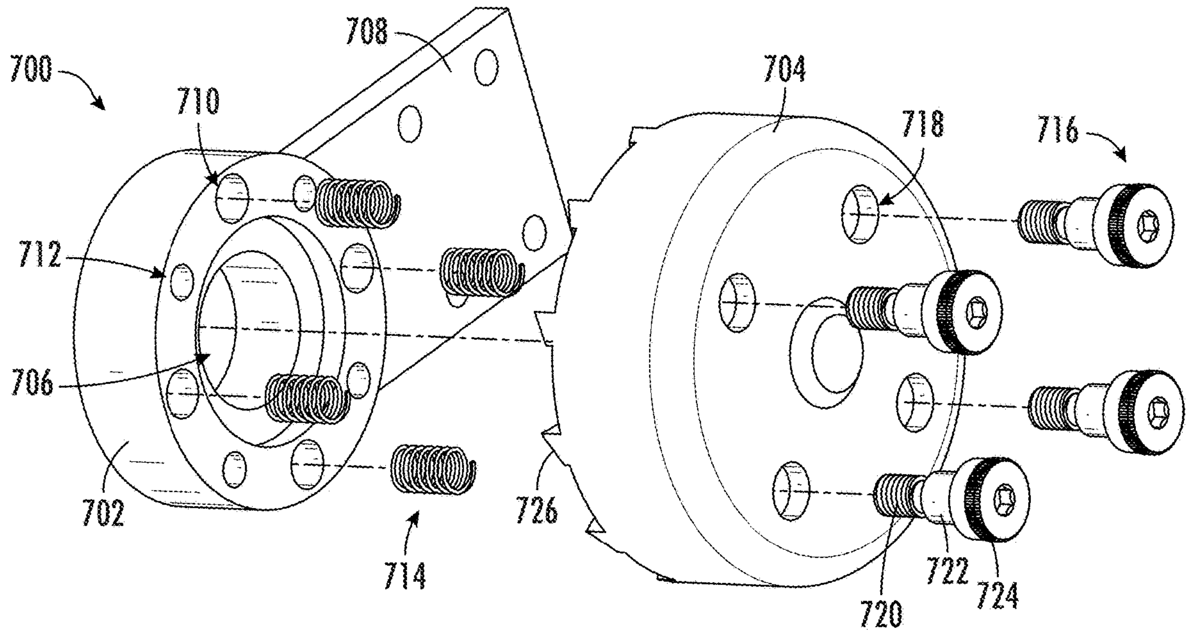
FIG. 7A is a schematic illustration of a hub assembly in accordance with an embodiment of the present disclosure.
Figure 7B:
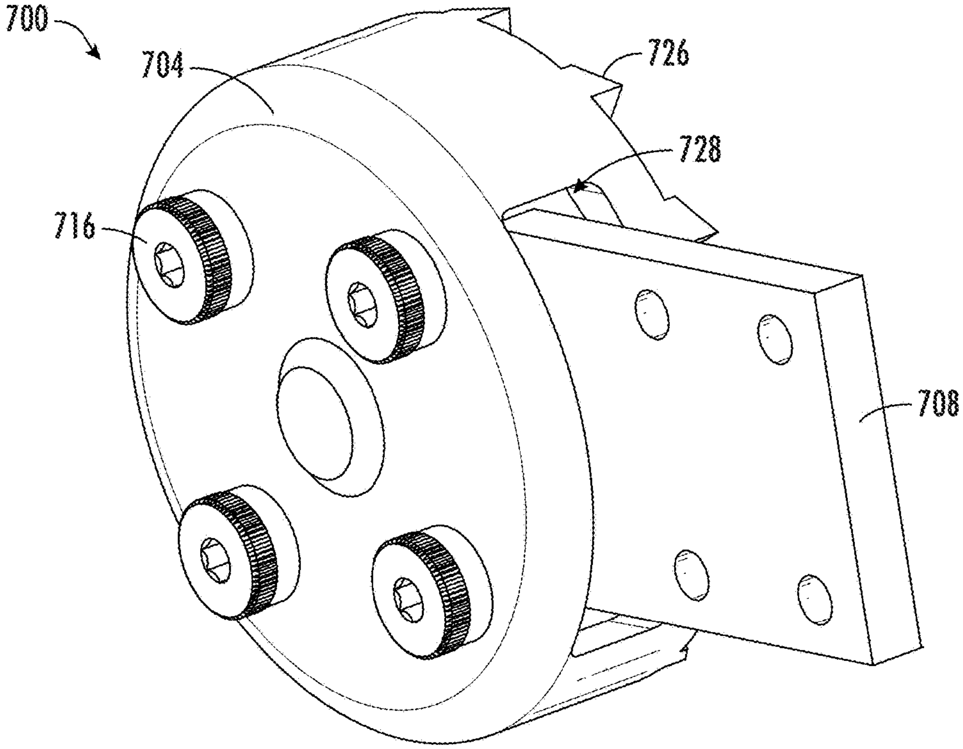
FIG. 7B illustrates the hub assembly of FIG. 7A in an alternative view.

Referring now to FIGS. 7A-7B, schematic illustrations of a portion of a hub assembly 700 in accordance with an embodiment of the present disclosure are shown. The hub assembly 700 may be configured to be operably connected and mounted to a shaft associated with a traction pulley or the like of an elevator system governor, as shown and described above. The hub assembly 700 includes an inner engagement hub 702 and an outer engagement hub 704. The inner engagement hub 702 is a substantially annular structure that is configured to be installed on a shaft of the traction pulley of a governor, with the shaft fitting through a mounting aperture 706 of the inner engagement hub 702.

The inner engagement hub 702 includes an actuation connector 708 that extends from an exterior surface thereof. The actuation connector 708 is operably connected to a safety linkage, as shown and described above. The inner engagement hub 702 includes a set of hub apertures 710, 712. For example, as shown, the inner engagement hub 702 includes a first set of hub apertures 710 that are configured to receive biasing elements 714 and the second set of hub apertures 712 are configured to receive hub fasteners 716.

The inner engagement hub 702 is configured to fit within the outer engagement hub 704. The outer engagement hub 704 includes a set of respective hub apertures 718 that are arranged to receive the hub fasteners 716 therethrough. The hub fasteners 716 are arranged to extend through the hub apertures 718 of the outer engagement hub 704 and threadedly connect to the second set of hub apertures 712 of the inner engagement hub 702. The hub fasteners 716 may be shoulder screws/bolts that include a threaded end 720, a shoulder 722, and a head 724. The threaded end 720 is configured to threadedly engage with a threaded hub aperture 712 (one of the second set of hub apertures 712) of the inner engagement hub 702. The shoulder 722 is a substantially smooth shaft of the hub fastener 716 that fits within/through the hub apertures 718 of the outer engagement hub 704 and allows for the outer engagement hub 704 to move along the shoulder 722. The head 724 is sized to provide a stop and/or limit the travel of the outer engagement hub 704.

The outer engagement hub 704 includes an engagement surface 726, in this configuration defining a set of teeth, for engagement with an engagement surface of a traction pulley, such as shown and as described above. The biasing elements 714 are arranged to bias the outer engagement hub 704 away from the inner engagement hub 702. In the normal biased state, with the biasing elements 714 urging the outer engagement hub 704 away from the inner engagement hub 702, the outer engagement hub 704 is urged into contact with the heads 724 of the hub fasteners 716. In this state, the engagement surface 726 of the outer engagement hub 704 is separated from an engagement surface of the traction pulley. As discussed above, an actuator may be configured to apply a force against the outer engagement hub 704 to overcome the biasing force of the biasing elements 714 to thereby cause engagement of the engagement surface 726 with a respective engagement surface of the traction pulley, as shown and described above.

As shown in FIG. 7B, the outer engagement hub 704 includes a connector opening 728 on a side thereof. The actuation connector 708 is configured to extend through the connector opening 728 and to connect to a safety linkage. The connector opening 728 is sized to permit relative movement of the inner engagement hub 702 and the actuation connector 708 thereof relative to the outer engagement hub 704. When a biasing force is applied to the outer engagement hub 704 by the actuator, the biasing force of the biasing elements 714 is overcome, and the engagement surface 726 of the outer engagement hub 704 will engage with an engagement surface of the traction pulley. The traction pulley will apply a rotational force to the outer engagement hub 704 and due to the fixed connection between the outer engagement hub 704 and the inner engagement hub 702 by means of the hub fasteners 716, the inner engagement hub 702 is also rotated. The rotation of the inner engagement hub 702 causes the actuation connector 708 to rotate within the connector opening 728 and cause actuation of a safety linkage to thereby operate a connected emergency safety brake system.

Figure 8A:
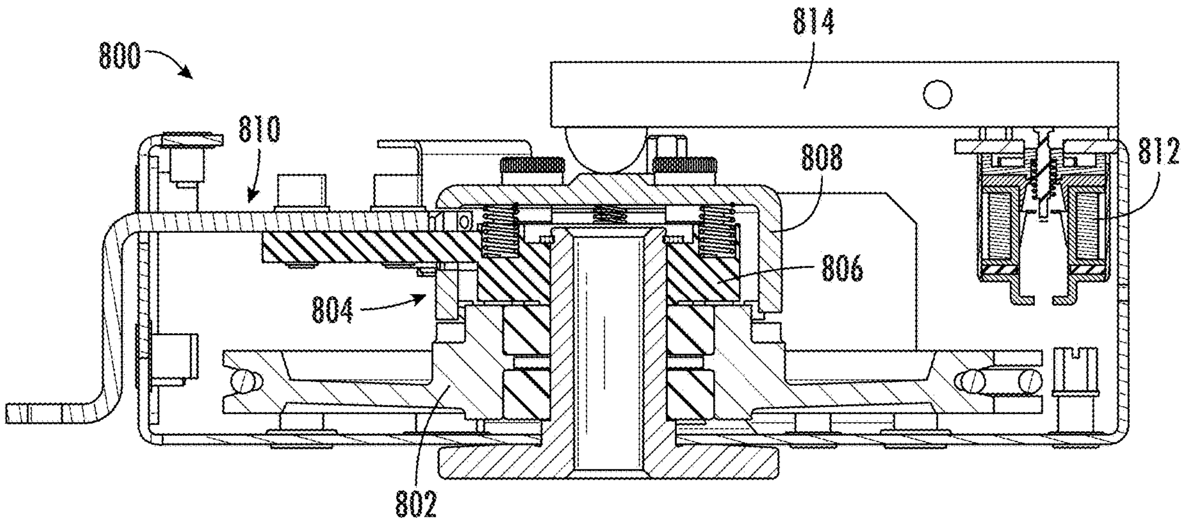
FIG. 8A is a schematic illustration of an alternative configuration of an electromechanical locking mechanism in accordance with an embodiment of the present disclosure, shown in a normal state of operation.
Figure 8B:
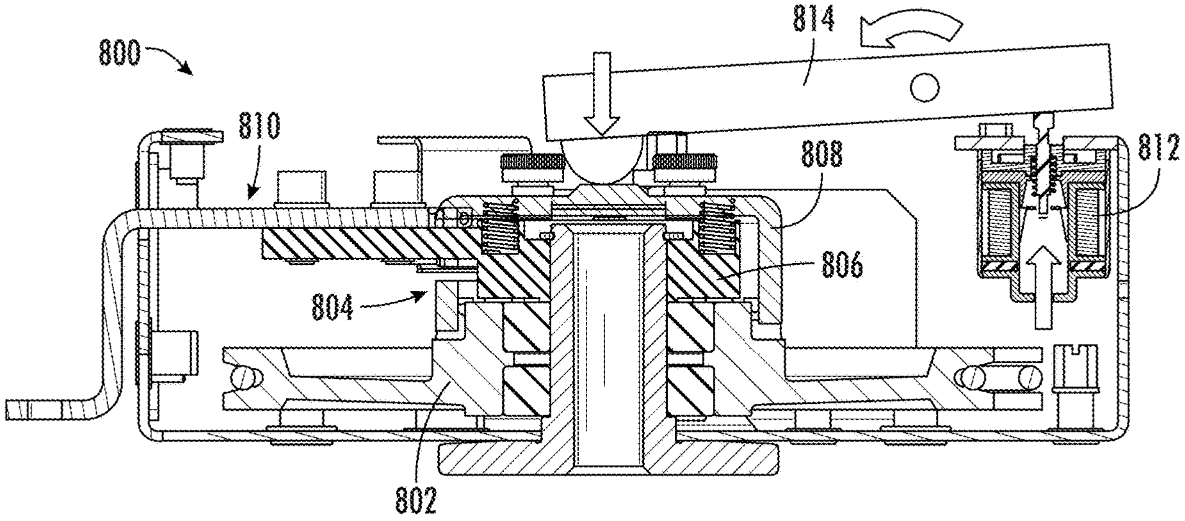
FIG. 8B is a schematic illustration of the electromechanical locking mechanism of FIG. 8A shown in an actuated state.

Referring now to FIGS. 8A-8B, schematic illustrations of another configuration of an electromechanical locking mechanism 800 in accordance with an embodiment of the present disclosure are shown. The electromechanical locking mechanism 800 may be part of an elevator system governor and is similar to that shown and described above. In this illustrative configuration, the electromechanical locking mechanism 800 includes a traction pulley 802 having an engagement surface that is configured to selectively engage with an engagement surface of a hub assembly 804 that is arranged relative thereto. The hub assembly 804 includes an inner engagement hub 806 and an outer engagement hub 808 having an engagement surface. The outer engagement hub 808 is configured to move relative to the inner engagement hub 806 and the traction pulley 802. The inner engagement hub 806 includes an actuation connector 810 that is configured to connect to a safety linkage, as described above. As such, the configuration of the electromechanical locking mechanism 800 is substantially similar to that shown and described above.

However, in the configuration of FIGS. 8A-8B, the actuation operation of the hub assembly 804 is different than the prior described embodiments. In the prior described embodiments, an actuator is arranged axially with the hub assembly and thus may require a support bracket (e.g., support bracket 520) to position the actuator relative to the hub assembly. However, it will be appreciated that such configuration is not intended to be limiting and that other arrangements may be employed without departing from the scope of the present disclosure. For example, as shown in FIGS. 8A-8B, the electromechanical locking mechanism 800 includes an actuator 812 that is offset from a center line or shaft through the hub assembly 804. The actuator 812 is operably coupled to the hub assembly 804 by a pivot arm 814. The pivot arm 814 allows for offset linear actuation of the actuator 812 to be transferred to axial movement of the outer engagement hub 908 to cause the above described actuation/operation to engage with the traction pulley 802 and thereby cause rotation of the actuation connector 810.

In accordance with embodiments of the present disclosure, improved safety mechanisms for elevator systems are provided. The safety mechanisms of the present disclosure are related to the operation of governors for traveling components of the elevator systems (e.g., elevator cars, counterweights). The mechanisms disclosed herein simply conventional safety actuation mechanisms by eliminating the need for spinning weights or the like, and thus eliminate the calibration and adjustments thereof. Embodiments of the present disclosure provide for improved, precise, and more consistent safety actuation as compared to conventional systems. Furthermore, embodiments of the present disclosure can eliminate false tripping of the safety system because the inertia effect of the spinning weights is eliminated.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system governor comprising:

a traction pulley having an engagement surface;

a cable wound about the traction pulley, wherein the traction pulley is configured to travel along the cable; and an electromechanical locking mechanism configured to selectively engage with the traction pulley to cause operation of a safety brake of an elevator system, wherein the electromechanical locking mechanism comprises:

a hub assembly having an inner engagement hub and an outer engagement hub;

the inner engagement hub comprises an actuator connector configured to connect to a safety linkage;

the outer engagement hub comprises an engagement surface configured to selectively engage with the engagement surface of the traction pulley; and an actuator is configured to selectively apply force to the outer engagement hub to transition the outer engagement hub from a disengaged position to an engaged position wherein the engagement surface of the outer engagement hub and the engagement surface of the traction pulley are engaged, and to cause rotation of the inner engagement hub.

2. The elevator system governor according to claim 1, further comprising at least one hub fastener arranged to connect the outer engagement hub to the inner engagement hub, wherein at least one hub fastener is threadedly connected to the inner engagement hub and retains the outer engagement hub to the inner engagement hub.

3. The elevator system governor according to claim 1, wherein the engagement surface of the outer engagement hub and the engagement surface of the traction pulley are configured as complimentary sets of teeth or complimentary friction surfaces.

4. The elevator system governor according to claim 1, further comprising at least one biasing element arranged between the inner engagement hub and the outer engagement hub, the at least one biasing element configured to bias the outer engagement hub toward the disengaged position.

5. The elevator system governor according to claim 4, wherein the actuator is configured to apply a force to overcome a biasing force of the at least one biasing element to urge the outer engagement hub into the engaged position.

6. The elevator system governor according to claim 1, further comprising an idler pulley, wherein the cable is wound about the idler pulley.

7. The elevator system governor according to claim 6, further comprising:

an encoder operably coupled to the idler pulley; and a controller configured to receive a signal from the encoder, the controller configured to cause actuation of the actuator in response to detection of an overspeed event determined from the signal from the encoder.

8. The elevator system governor according to claim 1, further comprising an actuator bracket, wherein the actuator is mounted on the actuator bracket and positioned in an axial position relative to an axis through the hub assembly.

9. The elevator system governor according to claim 1, wherein the actuator is arranged offset from an axis through the hub assembly, the elevator system governor further comprising a pivot arm operably connecting the actuator to the outer engagement hub.

10. The elevator system governor according to claim 1, wherein the outer engagement hub comprises a connector opening, wherein the actuator connector of the inner engagement hub extends through the connector opening of the outer engagement hub.

11. An elevator system comprising:

an elevator car configured to travel within an elevator shaft, the elevator car configured with a safety brake;

a counterweight operably connected to the elevator car and configured to travel within the elevator shaft, the counterweight configured with a safety brake; and an elevator system governor operably connected to one of the elevator car and the counterweight and connecting said elevator car or counterweight to a respective safety brake, the elevator system governor comprising:

a traction pulley having an engagement surface;

a cable extending along the elevator shaft and wound about the traction pulley, wherein the traction pulley is configured to travel along the cable; and an electromechanical locking mechanism configured to selectively engage with the traction pulley to cause operation of the respective safety brake, wherein the electromechanical locking mechanism comprises:

a hub assembly having an inner engagement hub and an outer engagement hub;

the inner engagement hub comprises an actuator connector configured to connect to a safety linkage that connects to the respective safety brake;

the outer engagement hub comprises an engagement surface configured to selectively engage with the engagement surface of the traction pulley; and an actuator is configured to selectively apply force to the outer engagement hub to transition the outer engagement hub from a disengaged position to an engaged position wherein the engagement surface of the outer engagement hub and the engagement surface of the traction pulley are engaged, and to cause rotation of the inner engagement hub to actuate the respective safety brake.

12. The elevator system according to claim 11, wherein the elevator system governor is a first elevator system governor operably connected between the elevator car and the safety brake thereof, the elevator system further comprising:

a second elevator system governor operably connected between the counterweight and the safety brake thereof.

13. The elevator system according to claim 11, further comprising at least one hub fastener arranged to connect the outer engagement hub to the inner engagement hub, wherein at least one hub fastener is threadedly connected to the inner engagement hub and retains the outer engagement hub to the inner engagement hub.

14. The elevator system according to claim 11, wherein the engagement surface of the outer engagement hub and the engagement surface of the traction pulley are configured as complimentary sets of teeth or complimentary friction surfaces.

15. The elevator system according to claim 11, further comprising at least one biasing element arranged between the inner engagement hub and the outer engagement hub, the at least one biasing element configured to bias the outer engagement hub toward the disengaged position.

16. The elevator system according to claim 15, wherein the actuator is configured to apply a force to overcome a biasing force of the at least one biasing element to urge the outer engagement hub into the engaged position.

17. The elevator system according to claim 11, further comprising an idler pulley, wherein the cable is wound about the idler pulley.

18. The elevator system according to claim 17, further comprising:

an encoder operably coupled to the idler pulley; and a controller configured to receive a signal from the encoder, the controller configured to cause actuation of the actuator in response to detection of an overspeed event determined from the signal from the encoder.

19. The elevator system according to claim 11, further comprising an actuator bracket, wherein the actuator is mounted on the actuator bracket and positioned in an axial position relative to an axis through the hub assembly.

20. The elevator system according to claim 11, wherein the actuator is arranged offset from an axis through the hub assembly, the elevator system governor further comprising a pivot arm operably connecting the actuator to the outer engagement hub.

* * * * *